(No Model.)
F. P. HOUGHTALING.
LAND ROLLER.
No. 356,835. Patented Feb. 1, 1887.
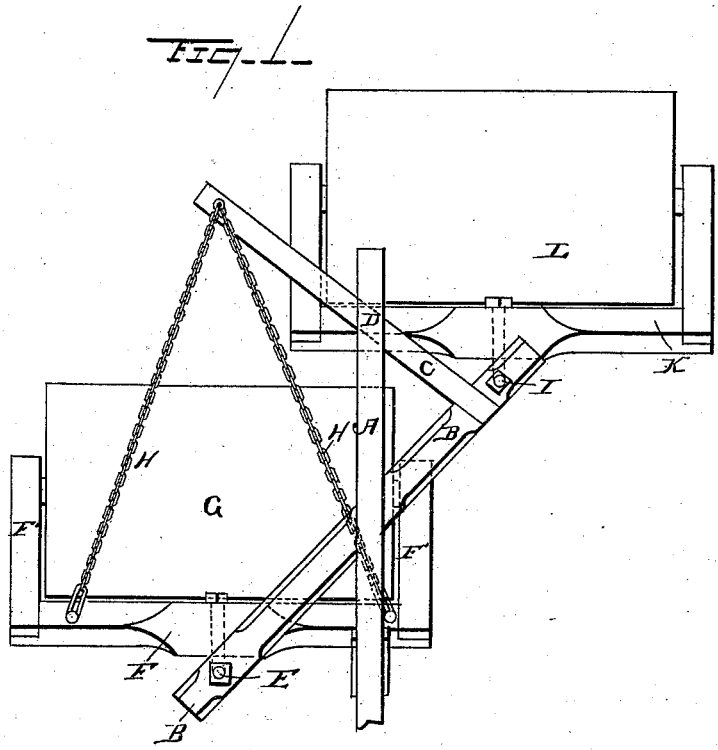
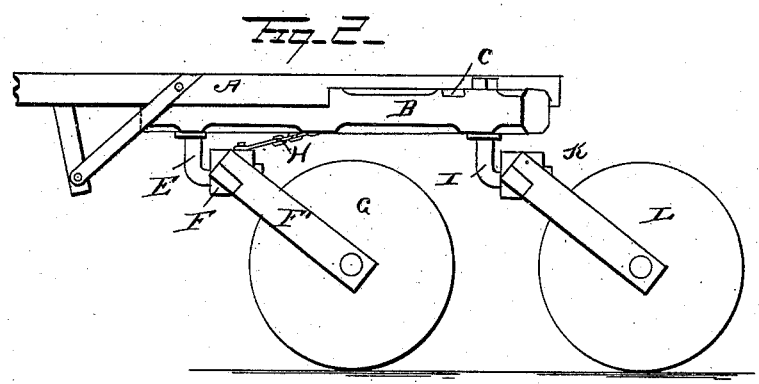
Witnesses
W. T. Gill
E. G. Siggers.
Inventor
Franklin Pierce Houghtaling
By his Attorneys

UNITED STATES PATENT OFFICE.

FRANKLIN PIERCE HOUGHTALING, OF COLDWATER, MICHIGAN.

LAND-ROLLER.

SPECIFICATION forming part of Letters Patent No. 356,835, dated February 1, 1887.

Application filed April 28, 1886. Serial No. 200,461. (No model.)

*To all whom it may concern:*

Be it known that I, FRANKLIN PIERCE HOUGHTALING, a citizen of the United States, residing at Coldwater, in the county of Branch and State of Michigan, have invented a new and useful Improvement in Land-Rollers, of which the following is a specification.

My invention relates to an improvement in land-rollers; and it consists in the peculiar construction and combination of devices that will be more fully set forth hereinafter, and particularly pointed out in the claim.

In the drawings, Figure 1 is a top plan view of a roller embodying my improvements. Fig. 2 is a side elevation of the same.

A represents a draft tongue or pole, to which, near the rear end of the said tongue, is attached a diagonally-extending beam, B, which extends for a suitable distance beyond each side of the tongue. From the rear end of the beam, at substantially a right angle thereto, projects an arm, C, which is also secured near the rear end of the tongue, as at D, and projects outwardly beyond one side of the tongue for a considerable distance, as shown. The tongue, the beam, and the arm form the main frame of the machine.

E represents a right-angled bolt, the upper end of which is pivoted in a vertical opening made in the front end of the beam B. The rear lower arm of the right-angled bolt passes horizontally through the center of the bar F. To the ends of the said bar, and projecting downwardly at an angle of about forty-five degrees therefrom, are attached bars F'. The said bar F and the side bars, F', form a frame, in which is journaled a roller, G. To the outer end of the frame is attached a chain, H, which extends rearwardly to the outer end of the arm C, and is attached thereto, and from thence the chain passes forwardly and diagonally to the inner end of the roller-frame, and is secured thereto, as shown. The function of this chain is to prevent the roller-frame from turning horizontally with relation to the main frame, and to permit the said roller-frame to vibrate vertically on the horizontal rear pivotal arm of the right-angled bolt E.

I represents a right-angled bolt, which is similar in construction to the bolt E, and has its vertical arm pivoted in an opening made in the rear end of the diagonal beam B.

K represents a roller-frame, which is similar in construction to the frame F, and is pivoted at its center on the horizontal rearward-extending arm of the bolt I. This frame K also carries a roller, L, which is similar in size and shape to the roller G.

From the foregoing description, and by reference to the accompanying drawings, it will be understood that the rollers are carried in frames which are pivoted to opposite sides of the main frame of the machine, and that as the latter advances the roller-frames are free to turn on their pivotal bolts, and thereby permit the machine to be turned in a short space. The lower frames, by being also pivoted on the horizontal rear-extending arms of the right-angled pivotal bolts, are free to vibrate vertically, and thereby adapt the rollers to inequalities of the land, and permit one of the rollers to rise at one end, in order to pass a stone or stump or other obstruction, while the other roller remains in contact with the ground and at work.

Having thus described my invention, I claim—

The combination of the main frame, comprising the tongue A, the diagonal beam B, secured thereto, and the arm C, extending rearwardly at substantially right angles from the beam B, the right-angled bolts E and I, having their vertical arms pivoted in opposite ends of the beam B, the roller-frames F and K, pivoted centrally on the horizontal arms of the right-angled bolts, and carrying rollers G and L, respectively, and the chain H, connecting the frame F with the arm C, for the purpose set forth, substantially as described.

In testimony that I claim the foregoing as my own I have hereto affixed my signature in presence of two witnesses.

FRANKLIN PIERCE HOUGHTALING.

Witnesses:
    AHUH A. PHILBRICK,
    PERRY K. HARRIS.